US007729005B2

(12) United States Patent
Okanishi et al.

(10) Patent No.: US 7,729,005 B2
(45) Date of Patent: Jun. 1, 2010

(54) IMAGE FORMING APPARATUS AND ITS CONTROL METHOD

(75) Inventors: Tadashi Okanishi, Shizuoka-ken (JP); Kazuhisa Maruyama, Sagamihara (JP); Ryuichi Yoshizawa, Numazu (JP); Akihiro Nakamura, Mishima (JP); Atsuya Takahashi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 1210 days.

(21) Appl. No.: 11/295,490

(22) Filed: Dec. 7, 2005

(65) Prior Publication Data

US 2006/0126092 A1 Jun. 15, 2006

(30) Foreign Application Priority Data

Dec. 15, 2004 (JP) ............................ 2004-363592
Nov. 11, 2005 (JP) ............................ 2005-328026

(51) Int. Cl.
*G06K 15/00* (2006.01)
*G06F 3/12* (2006.01)

(52) U.S. Cl. .................................... 358/1.18; 358/1.13

(58) Field of Classification Search .................. 358/1.1, 358/1.4, 1.5, 1.6, 1.9, 1.12, 1.13, 1.14, 1.15, 358/1.18, 498, 449, 450; 399/1, 43, 361, 399/364, 367, 369, 370, 371, 372, 373, 374, 399/376, 377, 383, 388, 389, 393, 397, 398, 399/401, 402, 407; 347/3, 5, 14, 23; 355/407, 355/408, 24, 23

See application file for complete search history.

(56) References Cited

U.S. PATENT DOCUMENTS

| | | | | |
|---|---|---|---|---|
| 4,935,786 | A | 6/1990 | Veeder | 355/319 |
| 4,975,738 | A | 12/1990 | Senma et al. | 355/77 |
| 5,841,362 | A | 11/1998 | Nakamura et al. | 340/825.03 |
| 5,912,101 | A | 6/1999 | Karaki et al. | 430/110 |
| 5,956,557 | A | 9/1999 | Kato et al. | 399/401 |
| 5,963,755 | A | 10/1999 | Ueda et al. | 399/23 |
| 6,226,470 | B1 * | 5/2001 | Kohtani et al. | 399/75 |
| 6,282,388 | B1 | 8/2001 | Obata | 399/82 |
| 6,301,452 | B1 | 10/2001 | Yoshizawa | 399/45 |
| 6,496,660 | B2 | 12/2002 | Takahashi et al. | 399/16 |
| 6,785,478 | B2 | 8/2004 | Takahashi et al. | 399/16 |
| 6,873,820 | B2 | 3/2005 | Tanaka et al. | 399/395 |
| 2006/0126092 | A1 | 6/2006 | Okanishi et al. | 358/1.13 |

FOREIGN PATENT DOCUMENTS

| | | |
|---|---|---|
| JP | 1-241583 | 9/1989 |
| JP | 2001-088496 | 4/2001 |

* cited by examiner

*Primary Examiner*—Dov Popovici
(74) *Attorney, Agent, or Firm*—Fitzpatrick, Cella, Harper & Scinto

(57) ABSTRACT

An engine control section detects that a sheet in a cassette is exhausted during duplex image formation. If a sheet with its first surface being printed is on standby in a duplexer, an image formation timing signal is output for a first surface of a sheet not fed because of a paper-out. Subsequently, an image formation timing signal is output for a second surface of the sheet that is in the duplexer and has its first surface printed. After completing the image formation of the second surface of the sheet, the operation is halted.

13 Claims, 12 Drawing Sheets

| | ID4 | ID3 | ID2 | ID1 |
|---|---|---|---|---|
| RESERVATION ID | 1 | 1 | 0 | 0 |
| IN-PAPER-FEED ID | 0 | 0 | 0 | 0 |
| IN-PRINT ID | 1 | 1 | 0 | 0 |

FIG.7

| | ID4 | ID3 | ID2 | ID1 |
|---|---|---|---|---|
| RESERVATION ID | 1 | 0 | 0 | 0 |
| IN-PAPER-FEED ID | 0 | 0 | 0 | 0 |
| IN-PRINT ID | 1 | 0 | 0 | 0 |

FIG.9

| | ID5 | ID4 | ID3 | ID2 | ID1 |
|---|---|---|---|---|---|
| RESERVATION ID | 1 | 1 | 0 | 0 | 0 |
| IN-PAPER-FEED ID | 0 | 0 | 0 | 0 | 0 |
| IN-PRINT ID | 1 | 1 | 0 | 0 | 0 |

FIG.11

IMAGE FORMING APPARATUS AND ITS CONTROL METHOD

BACKGROUND OF THE INVENTION

1. Field of the Invention

The present invention relates to an image forming apparatus and its control method applicable to an image forming apparatus such as electrophotographic or electrostatic copiers and printers.

2. Description of the Related Art

An outline of an entire configuration of a laser printer as an image forming apparatus will be described with reference to FIG. 1.

As shown in FIG. 1, the laser printer forms electrostatic latent images in an image forming section according to image light produced in response to image signals sent from a control section not shown, and forms visible color images by the development of the electrostatic latent images and by the superimposition transfer of the visible images. The visible color images are transferred onto a sheet (that is, recording medium) 2, and is fused on the sheet 2. The image forming section has photosensitive bodies (5Y, 5M, 5C, 5K) provided for individual stations juxtaposed by the number of development colors (four colors); injection charging means (7Y, 7M, 7C, 7K) as primary charging means; and developing means (8Y, 8M, 8C, 8K). The image forming section further includes toner cartridges (11Y, 11M, 11C, 11K), an intermediate transfer body 12, a paper feed section 1, a transfer section and a fusing section 13. Here Y designates yellow of the development colors, M designates magenta of the development colors, C designates cyan of the development colors, and K designates black of the development colors.

The photosensitive bodies (5Y, 5M, 5C, 5K), injection charging means (7Y, 7M, 7C, 7K) as the primary charging means, and the developing means (8Y, 8M, 8C, 8K) are mounted on process cartridges (22Y, 22M, 22C, 22K) which are detachably installed in the main body of the image forming apparatus.

The photosensitive drums (photosensitive bodies) 5Y, 5M, 5C and 5K, each of which is formed by applying an organic photoconductive layer on the outer surface of an aluminum cylinder, are rotated by a driving force transferred from a driving motor not shown. The driving motor causes the photosensitive drums 5Y, 5M, 5C and 5K to rotate counterclockwise in response to the image forming operation. The exposure light beams to the photosensitive drums 5Y, 5M, 5C and 5K are sent from scanners 10Y, 10M, 10C and 10K, and are selectively exposed on the surfaces of the photosensitive drums 5Y, 5M, 5C and 5K so as to form the electrostatic latent images.

The primary charging means has four injection charging units 7Y, 7M, 7C and 7K for charging the photosensitive bodies of yellow (Y), magenta (M), cyan (C) and black (K) for the stations, respectively. The injection charging units include sleeves 7YS, 7MS, 7CS, and 7KS, respectively.

The developing means includes four developing units 8Y, 8M, 8C and 8K for developing the yellow (Y), magenta (M), cyan (C) and black (K) at the individual stations to make the electrostatic latent images visible, respectively. The developing units have sleeves 8YS, 8MS, 8CS and 8CK, and are mounted detachably.

The intermediate transfer body 12, which makes contact with the photosensitive drums 5Y, 5M, 5C and 5K and rotates clockwise when forming the color image, rotates in conjunction with the rotation of the photosensitive drums 5Y, 5M, 5C and 5K, and receives the transfer of the visible images. In addition, the intermediate transfer body 12 makes contact with a transfer roller 9, which will be described later, when forming the image, and pinches and transports the sheet 2, thereby carrying out the superimposition transfer of the visible color images on the intermediate transfer body 12 to the sheet 2.

The transfer roller 9 is placed at the position 9*a* to make contact with the intermediate transfer body during the superimposition transfer of the visible color images on the intermediate transfer body 12 to the sheet, but is separated therefrom to the position 9*b* once the printing processing is completed. In other words, the transfer roller 9 moves in the direction of the arrow in FIG. 1 to make contact with or separation from the intermediate transfer body 12.

The fusing section 13, which fuses the transferred visible color images with conveying the sheet 2, includes a fusing roller 14 for heating the sheet 2 and a press roller 15 for pressing the sheet 2 on the fusing roller 14. The fusing roller 14 and press roller 15 are made hollow to include heaters 16 and 17 in the inside, respectively. Thus, the sheet 2 holding the visible color images is conveyed by the fusing roller 14 and press roller 15, and the toners are fused on its surface by imposing heat and pressure. After the visible image fusing, the sheet 2 is output to a paper output section, and the image forming operation is completed.

The printer controls the transportation of the sheet with a lower transport sensor A 23, an upper transport sensor A 24, a lower transport sensor B 25, an upper transport sensor B 26, a registration sensor 19, a pre-fusing sensor 27, a fused paper output sensor 20, and a paper output sensor 28 on the sheet transport path. In addition, at the paper feed slot of a paper feed section (cassette) 1, a sensor (not shown) is provided for detecting the presence and absence of the sheet in the paper feed section 1.

A cleaning means 21 cleans the toners left on the photosensitive drums 5Y, 5M, 5C and 5K and on the intermediate transfer body 12. Through the cleaning, discarded toners after transferring the visible images, which are formed on the photosensitive drums 5Y, 5M, 5C and 5K with the toners, onto the intermediate transfer body 12 are stored in a cleaner container. In addition, through the cleaning, the discarded toners after transferring the visible color images with the four colors, which are formed on the intermediate transfer body 9, onto the sheet 2 are stored in the cleaner container.

FIG. 2 is a block diagram showing a system configuration of an image forming apparatus. A controller section 201 can communicate with a host computer 200 and an engine control section 203. The controller section 201 receives image information and a print instruction from the host computer 200. The controller section 201 analyzes the image information received and converts it to bit data, and delivers for each sheet a print reservation command, a print start command, and a video signal to the engine control section 203 via a video interface 210.

The engine control section 203 has a CPU 211 for receiving the command and data sent from the controller section 201 via the video interface 210, and for instructing operation processing for forming an image. The engine control section 203 further includes an image processor 212 as a circuit for processing the image data to be printed, and an image control section 213 for carrying out read control of the data processed by the image processor. The engine control section 203 further includes a fusing control section 214 for controlling the fusing temperature of the fusing section 13, and a sheet transport section 215 (corresponding to a plurality of pairs of transport rollers of FIG. 1) for conveying a sheet through the image forming apparatus. The engine control section 203 further includes a drive control section 216 for controlling driving of a motor (not shown) for driving the sheet transport section 215, and a duplex control section 217 for detecting transport conditions of the sheet in a duplexer, and for controlling the transport operation. In addition, the CPU 211 controls the various sections constituting the engine according to control procedures (including the control procedure shown in FIG. 3) in a ROM not shown.

The controller section 201 sends a print reservation command to the engine control section 203 in response to the print instruction from the host computer 200, and delivers a print start command to the engine control section 203 at a print enabled timing. In this case, according to the instructions from the host computer 200, the controller section 201 sends to the paper output option control section 202 an instruction about the usage of the paper output control option, and to a paper feed option control section 204 an instruction about the usage of the paper feed control option.

The engine control section 203 makes preparations for printing in accordance with the sequence of print reservation commands from the controller section 201, and waits for a print start command from the controller section 201. Receiving the print instruction, the engine control section 203 supplies the controller section 201 with a /TOP signal that gives a reference timing of outputting the video signal, and starts the print operation in response to the print reservation command. In addition, the engine control section 203 outputs a /TOPR signal that gives a timing of paper refeeding of the sheet waiting at the registration roller. The controller section 201 issues a paper refeeding instruction to a paper feed option input apparatus via a paper feed option control section 204 at the time when the /TOPR signal becomes "true".

FIG. 3 is a flowchart illustrating a print operation of the engine control section 203. Receiving the print reservation command, the engine control, section 203 waits for receiving the print start command (501), and carries out preprocessing for the print operation (called a "pre-rotation sequence" from now on) (502). After completing the pre-rotation sequence, the engine control section 203 outputs the /TOP signal, and starts the print operation in response to the print reservation command of a first sheet (503). Unless the engine control section 203 receives the next print reservation command by the next print operation start timing (called "normal print start timing") (505), it advances the processing to step 509 to maintain the throughput. At step 509, the engine control section 203 carries out post-processing of the print operation (called a "post-rotation sequence" from now on), and completes the print operation. When the engine control section 203 has received the print reservation command and the print start command for the print reservation command by the next normal print start timing, it starts the print operation of a second sheet following the first sheet (506 and 503). When the engine control section 203 has received the print reservation command but not the print start command by the next normal print start timing, it carries out the post-rotation sequence and enters a print start command waiting state (507 and 508) to wait for receiving the print start command. Receiving the print start command, the engine control section 203 starts the pre-rotation sequence (502).

FIG. 4 illustrates a communication sequence up to starting the duplex printing of a fourth sheet with carrying out alternate paper feed from the paper feed section 1 and the duplexer. The controller section 201 sends to the engine control section 203 a reservation command with a reservation ID=1 for feeding paper from the paper feed section 1 and for outputting paper to the duplexer at 311; and sends a reservation command with a reservation ID=2 for feeding paper from the paper feed section 1 and for outputting paper to the duplexer at 312. At 313, the controller section 201 sends a reservation command with a reservation ID=1 for feeding paper from the duplexer and for outputting paper to a paper output section outside the apparatus. These operation steps are performed repeatedly for the rest of the reservation IDs (314, 315, 316, 317 and 318). Subsequently, the controller section 201 instructs the engine control section 203 to start printing for the reserved ID in response to the reservation command at 319, and the engine starts the print operation. The engine control section 203, after receiving the print start command, supplies the controller section 201 of the image forming sequence with a /TOP signal and /TOPR signal (320 and 321) to form an image. On the other hand, the controller section 201 outputs a video signal in synchronization with the /TOP signal, and outputs the print start command for the next reservation ID. Incidentally, carrying out paper feed from the paper feed section 1 and from the duplexer alternately with placing a single standby sheet at the duplexer as illustrated by the reservation commands from 311 to 318 is referred to as "two-sheet alternate duplex" from now on.

FIG. 5 shows an image forming sequence for forming an image according to the communication sequence of the duplex print in FIG. 4. In the duplex print below, as for a sheet that is fed from the cassette and output to the duplexer, its surface on which printing is made first is called a "first surface", and its opposite surface on which printing is made while the sheet is fed from the duplexer and output to the outside of the image forming apparatus is called a "second surface". Receiving the print start command (print ID=1) associated with the print reservation command of the first surface of the first sheet, the engine control section 203 starts the pre-rotation sequence. After completing the pre-rotation sequence, the engine control section 203 outputs the /TOP signal (100-1-S) to start the print operation of the first sheet, and transports the sheet from the cassette to the duplexer (101-1-S). In synchronization with the /TOP signal, the controller section 201 supplies the video data to the engine control section 203 to start forming the image. The engine control section 203 carries out with the registration sensor 19 the timing adjustment between the sheet fed from the cassette and the image transferred onto the intermediate transfer body by the image forming section. By performing the timing adjustment, the engine control section 203 outputs the /TOPR signal, and refeeds the sheet to transfer the image onto the sheet (102-1-S). The image transferred onto the sheet undergoes heat fusing by the fusing section 13, and passes by the fused paper output sensor 20. Thus, the image formation on the first surface of the first sheet is completed (103-1-S).

Likewise, receiving the print start command (print ID=2) associated with the print reservation command of the first surface of the second sheet, the engine control section 203 outputs the /TOP signal (100-2-S) to start the print operation of the first surface of the second sheet. Thus, the sheet is transported from the cassette to the duplexer (101-2-S), and the /TOPR signal is output (102-2-S). Subsequently, the fusing section 13 carries out the heat fusing of the image completely transferred on the sheet. The sheet passes by the fused paper output sensor 20, and the image formation on first surface of the second sheet is completed (103-2-S).

Next, when receiving the print start command (print ID=1) associated with the print reservation command of the second surface of the first sheet, the engine control section 203 outputs the /TOP signal (100-1-D) to start the print operation of the second surface of the first sheet. Thus, the sheet is transported from the duplexer (101-1-D), and the /TOPR signal is output (102-1-D). Subsequently, the fusing section 13 carries out the heat fusing of the image completely transferred on the sheet. The sheet passes by the fused paper output sensor 20, and the image formation on the second surface of the first sheet is completed (103-1-D). The sheet whose first and second surfaces both undergo the image formation passes by the paper output sensor 28, and is output to the outside of the image forming apparatus. The foregoing operation is repeated for the four sheets, and the post-rotation sequence is carried out again after completing all the image formation, followed by the waiting state of the print start command.

FIG. 6 illustrates an image forming sequence when the sheet in the paper feed section 1 has run out at the fourth sheet while carrying out the image forming sequence described in connection with FIG. 5 according to the communication sequence up to the start of the duplex print of the fourth sheet with performing alternate paper feed from the paper feed section 1 and from the duplexer of FIG. 4. In this case, the printing cannot be continued. Although the engine control section 203 outputs the /TOP signal (100-4-S) of the first surface of the fourth sheet and continues the image formation of the second surface of the first sheet, the fourth sheet has run out. Thus, no sheet can be transported from the cassette to the duplexer (101-4-S). When the sheet in the cassette has run out, the sensor at the paper feed slot of the paper feed section 1 detects the paper-out, and notifies the engine control section 203. Thus, the engine control section 203 sets the sheet presence or absence status at a paper-out. In addition, since the paper-out occurs, the engine control section 203 informs the controller section 201 of an occurrence of a misprint because of the paper-out (110). When the paper-out occurs, the engine control section 203 continues the image forming operation up to the second surface of the second sheet. In other words, the engine control section 203 notifies the controller section 201 through a sheet transport status that the sheet transportation is halted at the time when the second surface of the second sheet has passed by the fused paper output sensor 20, and is output to the outside of the image forming apparatus (103-2-D).

When the misprint has occurred in the engine, and the sheet transport status of the engine becomes not-in-transit, the controller section 201 determines the print ID necessary for the recovery (reprint) as follows. Specifically, the controller section 201 determines the print ID necessary for the recovery (reprint) by receiving from the engine control section 203 the reservation ID registered already, the ID associated with the paper feed from the paper feed section, and the ID with which the print has already started. In the example of FIG. 6, a decision is made that the retransmission of the third and fourth sheets is necessary from the reservation ID, in-paper-feed ID and in-printing ID for the print ID as shown in FIG. 7. The engine control section 203 executes a misprint release sequence in response to a misprint release command from the controller section 201.

As for a configuration for controlling the image forming operation by assigning the IDs, Japanese patent application laid-open No. 2001-088496 describes it.

In the conventional example, the image forming operation is completed at the time when the paper-out is detected, and the controller section 201 is informed of the misprint due to the paper-out, and when the image formation of the first and second surfaces of the print IDs corresponding to the /TOP signals output up to that time has been completed. Then, the engine control section 203 sets the sheet transport status at the not-in-transit, and waits for the misprint release from the controller section 201. In this case, since a residual sheet having its one side printed remain in the duplexer, the processing is necessary for outputting the single-side printed residual sheet within the image forming apparatus after the misprint release. In addition, the print IDs for the single-side printed sheets are to be subjected to the recovery.

This will be described in more detail by way of example of FIG. 6. Since the fourth sheet undergoes the paper-out misprint, when the image formation of the second surface of the second sheet, which has the print ID previous to the single side (first surface) of the fourth sheet, has been completed, the sheet transport status is set at not-in-transit. At that time, since the single-side printed third sheet remains in the duplexer, the third sheet is to be output to the outside of the apparatus in the condition in which only its single side is printed. Accordingly, as for the third sheet which is a sheet previous to the paper-out decision and whose single side has already been printed, the controller section 201 must retransmit the reservation command to carry out paper feed and single side print again for the recovery.

In other words, since the third sheet is output to the outside of the apparatus without passing through the duplex printing, the third sheet with its single side printed goes to waste.

SUMMARY OF THE INVENTION

The present invention is implemented to solve the foregoing problems. It is therefore an object of the present invention to provide an improved image forming apparatus and its control method.

Another object of the present invention is to provide an image forming apparatus and its control method capable of preventing the single-side printed sheet remaining in the apparatus from going to waste even if the image formation cannot be continued during the duplex image formation.

According to a first aspect of the present invention, that is provided an image forming apparatus comprising: an image forming section for forming an image on a transfer body; a transfer section for transferring the image formed on said transfer body to a recording medium; a recording medium holding section for holding the recording mediums; a feeding section for feeding the recording mediums from said recording medium holding section to said transfer section; a recording medium detecting section for detecting whether or not the recording mediums exist in the said recording medium holding section; and a control section for controlling transport operation of the recording mediums, wherein said control section, when detecting with said recording medium detecting section that the recording mediums in said recording medium holding section do not exist during an image forming operation of both sides of a plurality of the recording mediums, halts the image forming operation after carrying out control operation for the image formation of a not-fed recording medium by said feeding section, and after transferring the image to a second surface of the recording medium that is being transported in said apparatus and formed an image to its first surface.

According to a second aspect of the present invention, that is a control method of an image forming apparatus comprising: a first step of carrying out, when detecting that recording mediums fed for image formation are finished during an image forming operation of both sides of a plurality of recording mediums, control operation for the image formation of a not-fed recording medium; and a second step of forming an image on a second surface of the recording medium which is being transported in said apparatus and formed an image to its first surface.

According to a third aspect of the present invention, that is an image forming apparatus comprising: an image forming section for forming an image on a transfer body; a transfer section for transferring the image formed on said transfer body to a recording medium; a recording medium holding section for holding the recording mediums; a feeding section for feeding the recording mediums from said recording medium holding section to said transfer section; a detecting section for detecting a feed condition of the recording mediums fed by said feeding section; and a control section for controlling transport operation of the recording mediums, wherein said control section, when detecting with said detecting section a condition in which a recording medium is not fed during an image forming operation of both sides of a plurality of the recording mediums, halts the image forming operation after carrying out control operation for the image formation of the not-fed recording medium by said feeding section, and after transferring the image to a second surface of the recording medium that is being transported in said apparatus and formed an image to its first surface.

According to a fourth aspect of the present invention, that is a control method of an image forming apparatus comprising: a first step of carrying out, when detecting that a recording medium to be fed for image formation is not fed during an image forming operation of both sides of a plurality of recording mediums, control operation for the image formation of a not-fed recording medium; and a second step of forming an image on a second surface of the recording medium which is being transported in said apparatus and formed the image to its first surface.

Further objects of the present invention will become apparent by reading the following description of the invention with reference to the accompanying drawings.

The above and other objects, effects, features and advantages of the present invention will become more apparent from the following description of embodiments thereof taken in conjunction with the accompanying drawings.

BRIEF DESCRIPTION OF THE DRAWINGS

FIG. 7 is a table showing an engine status in the case of misprint due to the paper-out during the alternate duplex image formation of four sheets in the conventional example;

FIG. 9 is a table showing an engine status in a case of misprint due to the paper-out during the alternate duplex image formation of four sheets in the embodiment 1;

FIG. 11 is a table showing an engine status in a case of misprint due to the paper-out during the alternate duplex image formation of five sheets in the embodiment 2.

DETAILED DESCRIPTION OF PREFERRED EMBODIMENTS

Figure 1:
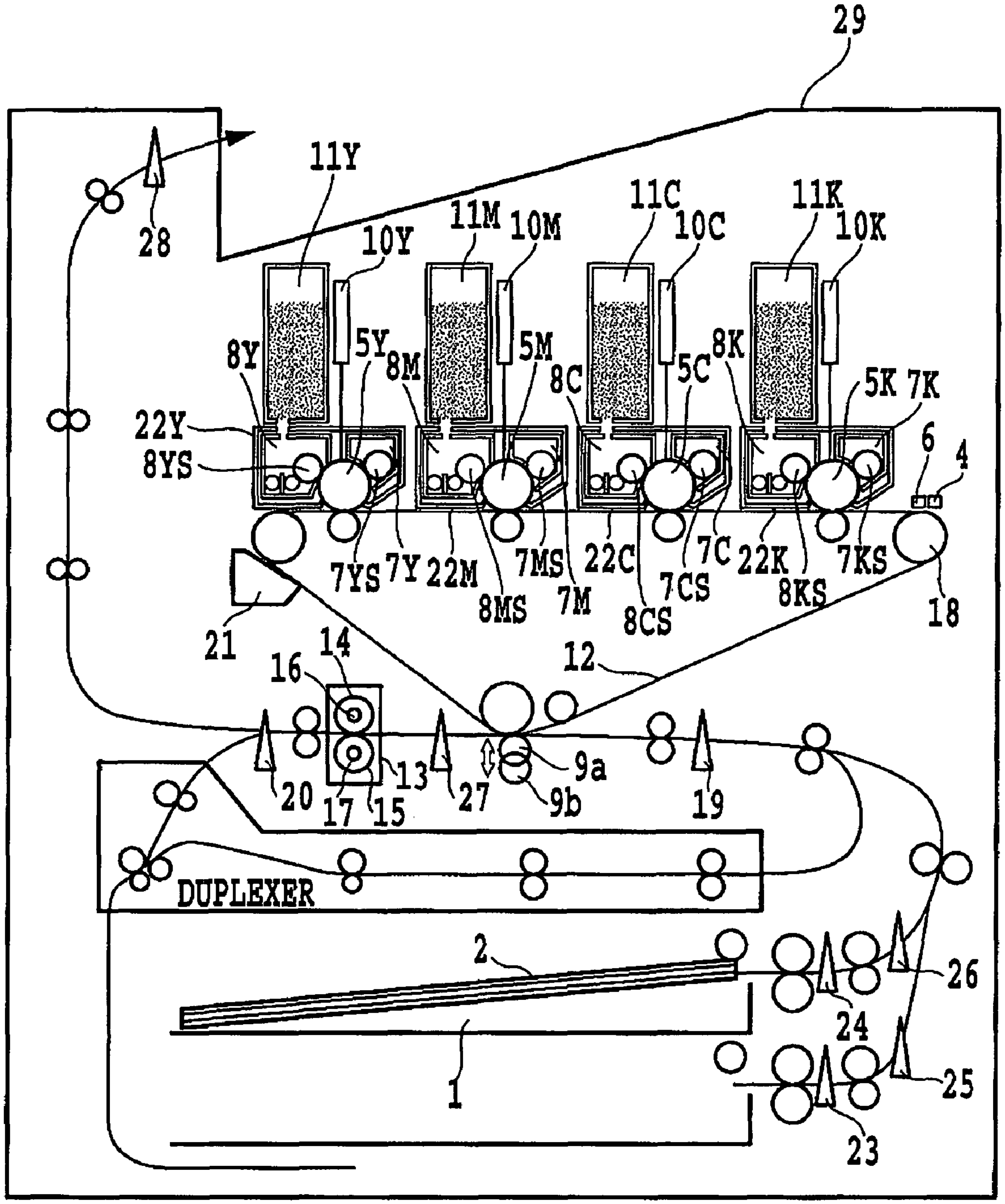
FIG. 1 is a view showing a schematic configuration of an image forming apparatus.
Figure 2:
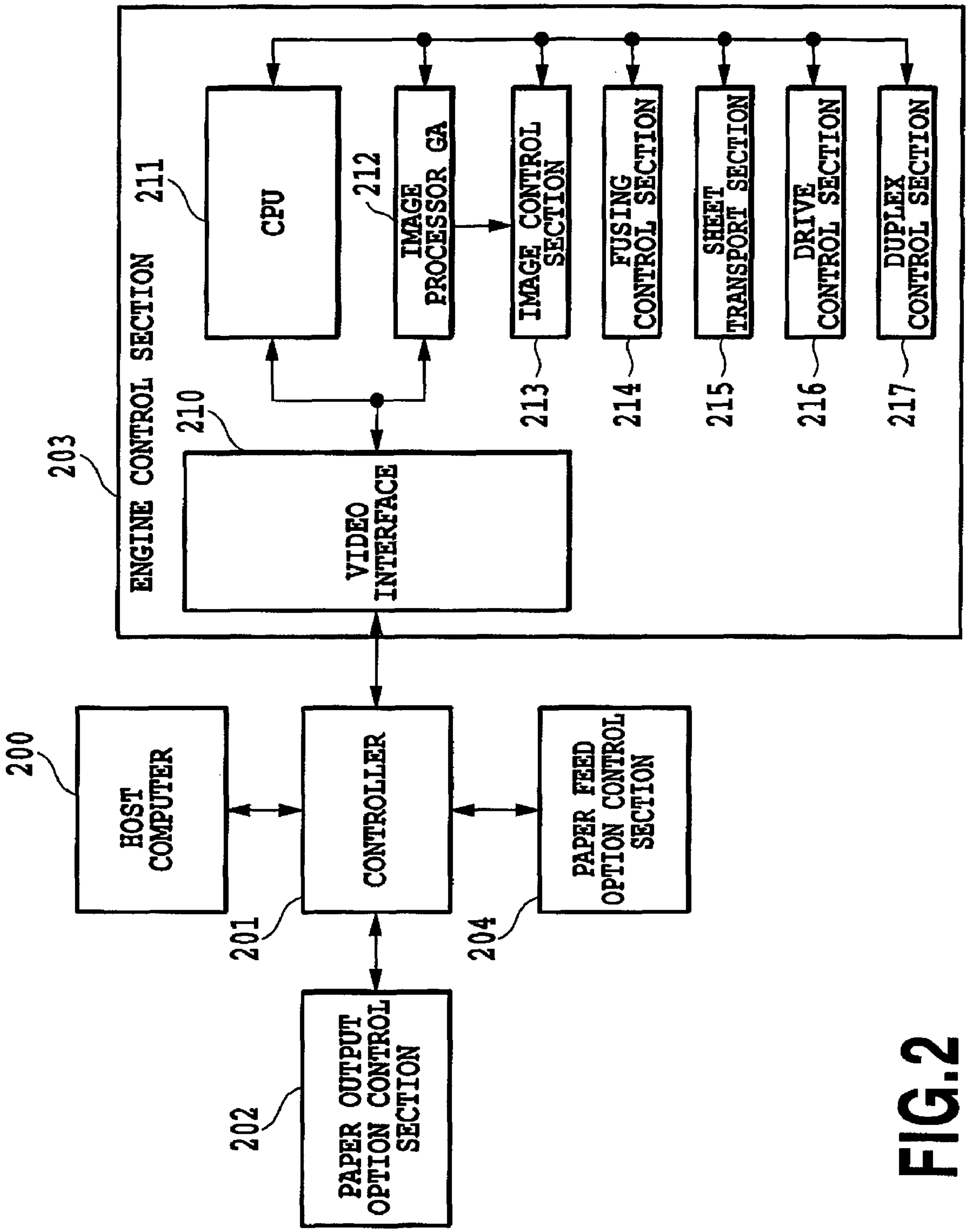
FIG. 2 is a block diagram showing a configuration of a control system of the image forming apparatus.
Figure 3:
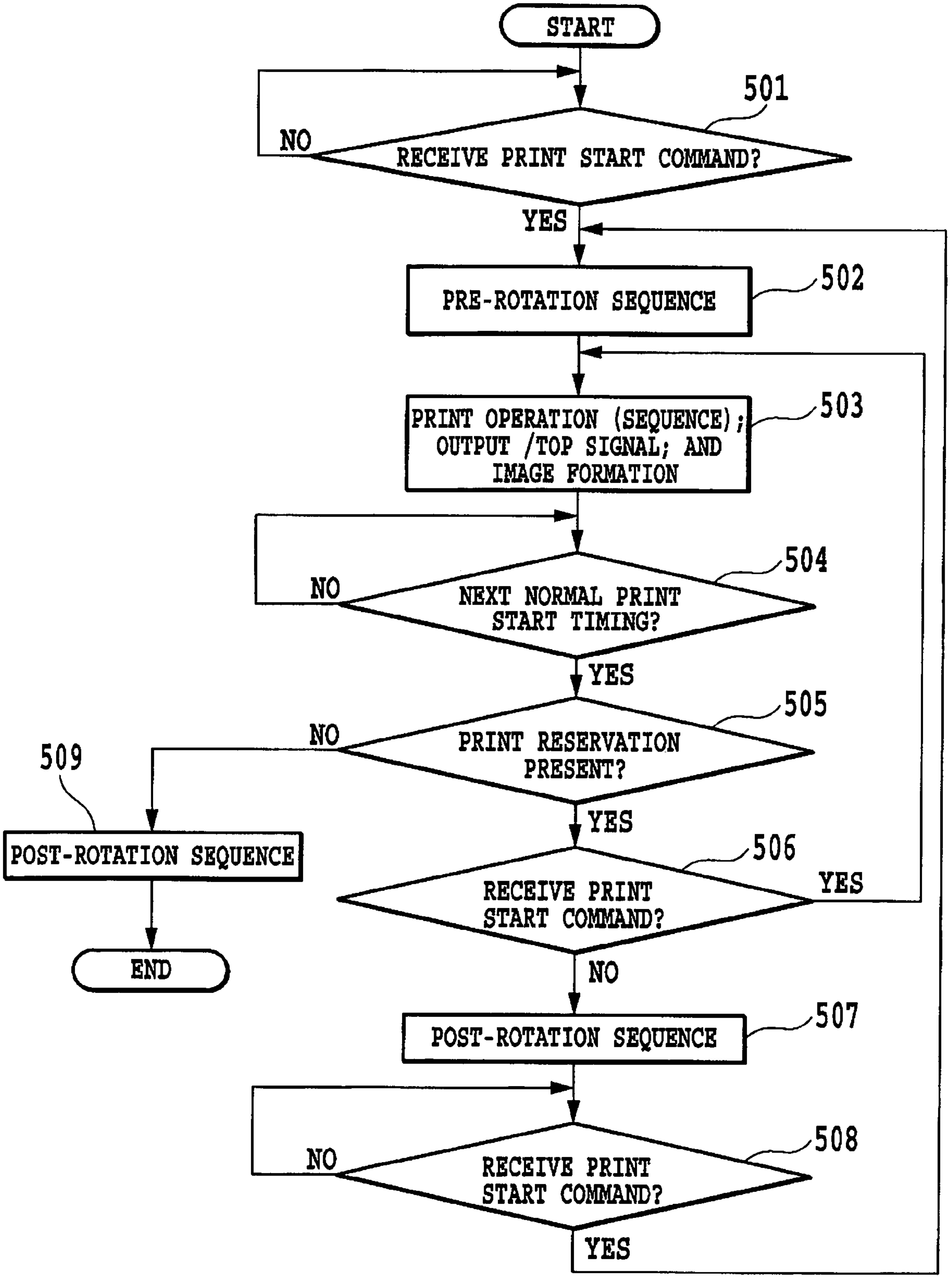
FIG. 3 is a flowchart of an image forming sequence of the image forming apparatus.

The embodiments to which the present invention is applicable will now be described in detail with reference to the accompanying drawings.

Embodiment 1

The present embodiment is characterized in that even if a paper-out occurs during a two sheet alternate duplex sequence, the sheet which has completed its image formation of the single side and is on standby in the image forming apparatus undergoes and completes the image formation of the second surface without fail. In other words, it proposes a method of stopping waste of the single-side printed sheet in the duplexer, and of outputting it to the outside of the apparatus after printing properly. The term "the two sheet alternate duplex sequence" refers to the control for forming images while carrying out paper feed alternately from the paper feed section 1 and the duplexer in a condition in which one single-side printed sheet is made to wait in the duplexer. Incidentally, since the configuration and basic operation of the image forming apparatus are the same as those described before, their description is omitted here, and the drawings are assigned the same reference numerals.

In the present embodiment, the CPU 211 constituting the engine control section 203 carries out the control according to the control procedure of the programs in a ROM not shown. More specifically, the CPU 211, referring to the outputs of the sensors 23-28, makes a decision as to the current job at which position the sheet is located in the transport path, or which side of the first surface and second surface of the sheet the image formation is made. In addition, the CPU 211 grasps what is the page number of the above sheet when counting from the first sheet that undergoes the image formation. In the engine control section 203, the CPU 211 controls the operation of the components of the printer engine according to the control procedure (including the control procedure of FIG. 12 which will be described later) based on the programs in the ROM not shown.

Figure 4:
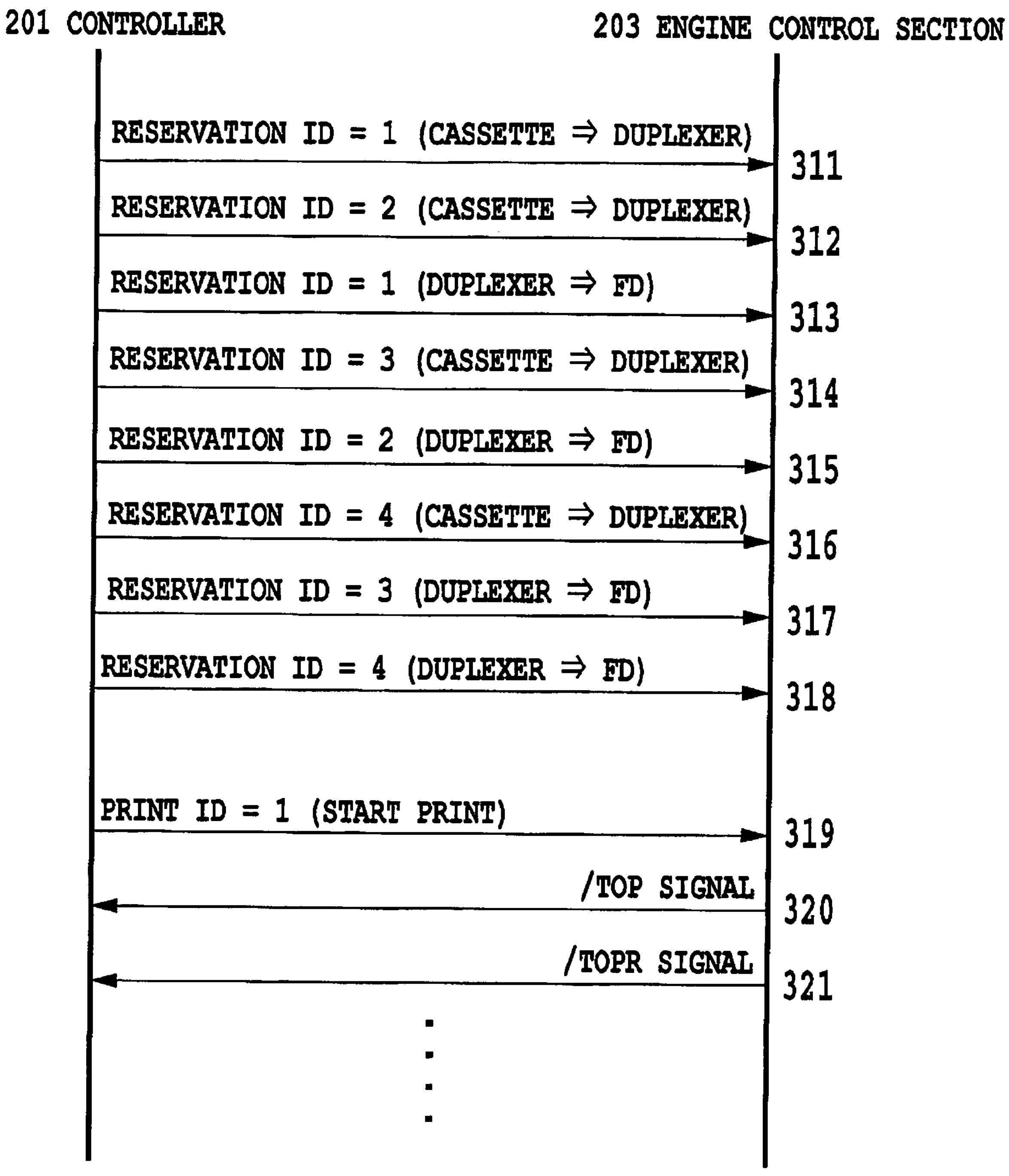
FIG. 4 is a diagram showing a sequence of duplex print commands.
Figure 5:
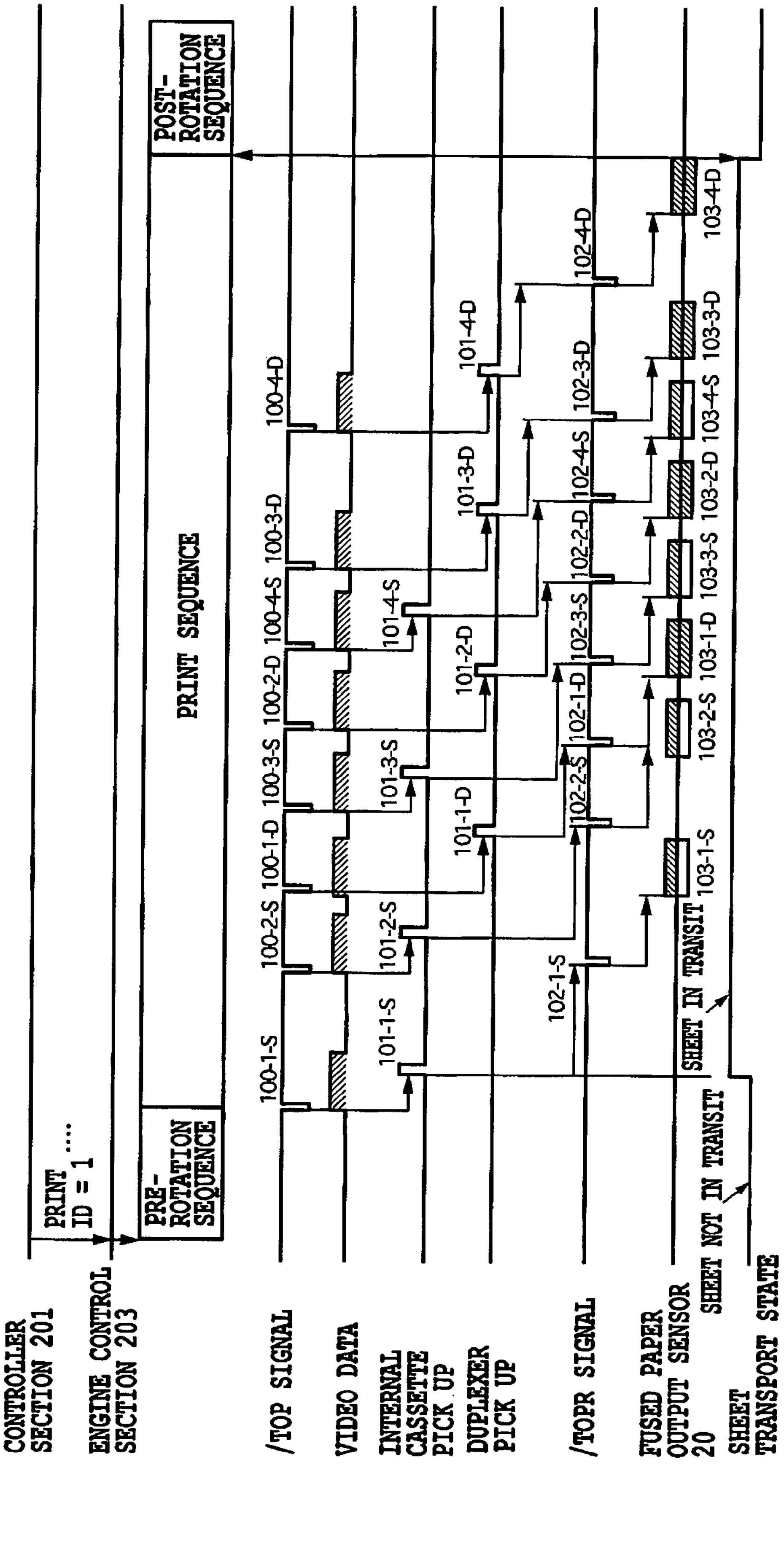
FIG. 5 is a diagram showing an alternate duplex image forming sequence (normal case) of four sheets.
Figure 6:
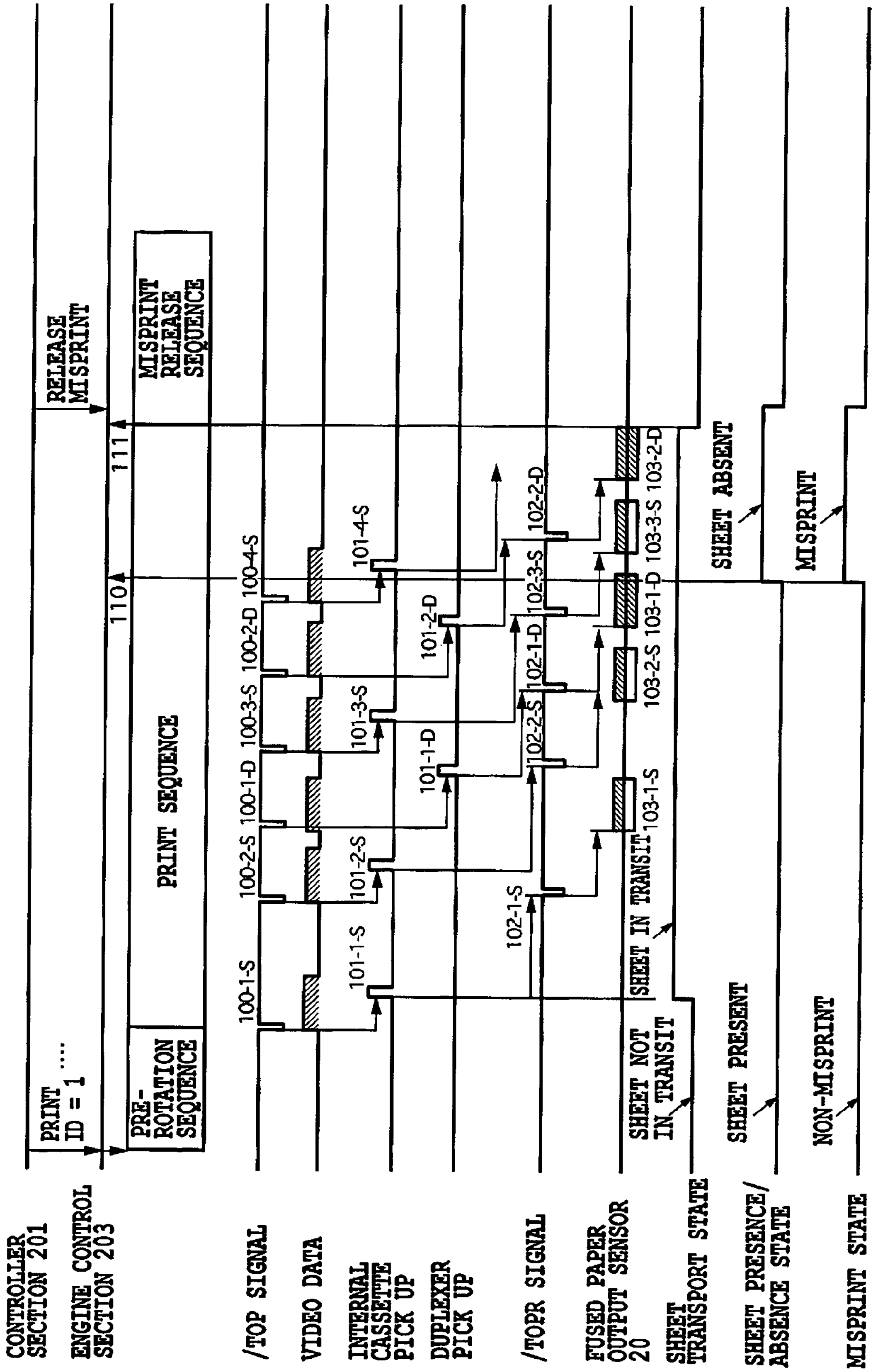
FIG. 6 is a diagram showing a case where a paper-out is detected during two-sheet alternate duplex image formation in a conventional example.
Figure 8:
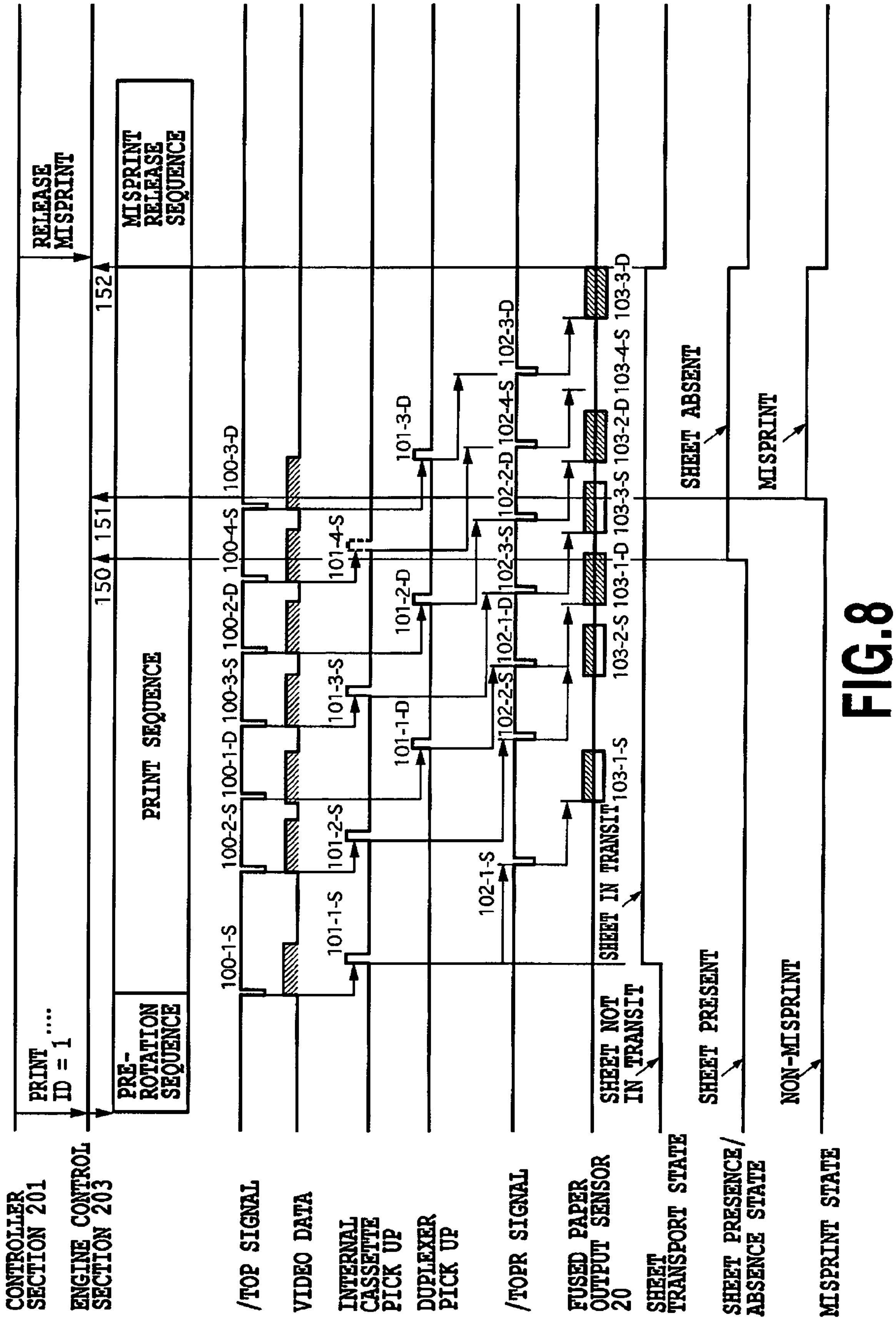
FIG. 8 is a diagram showing a case where a paper-out is detected during the alternate duplex image formation of four sheets in an embodiment 1.

FIG. 8 illustrates an image forming sequence when the printing cannot be continued because the sheets in the paper feed section 1 have run out at the fourth sheet while carrying out the image forming sequence described in connection with FIG. 5 according to the communication sequence of the alternate paper feed of two sheets described in FIG. 4. The engine control section 203 starts the pre-rotation sequence when it receives the print start command (print ID=1) associated with the print reservation command of the first surface of the first sheet. After completing the pre-rotation sequence, the engine control section 203 outputs the /TOP signal (100-1-S) as a timing signal indicating the timing of supplying the image forming section with the video data. Thus, the controller section 201 starts the print operation of the first sheet, and transports a sheet from the cassette to the duplexer (101-1-S). The controller section 201 supplies the video data to the engine control section 203 in synchronization with the /TOP signal, and starts the image formation. The engine control section 203 carries out with the registration sensor 19 the timing adjustment between the sheet fed from the cassette and the image transferred onto the intermediate transfer body by the image forming section. By performing the timing adjustment, the engine control section 203 outputs the /TOPR signal, and refeeds the sheet to transfer the image onto the sheet (102-1-S). The image transferred on the sheet undergoes heat fusing by the fusing section 13, and passes by the fused paper output sensor 20, thus completing the image formation on the first surface of the first sheet (103-1-S).

Likewise, receiving the print start command (print ID=2) associated with the print reservation command of the first surface of the second sheet, the engine control section 203 outputs the /TOP signal (100-2-S) to start the print operation of the first surface of the second sheet. Thus, the sheet is transported from the cassette to the duplexer (101-2-S), and the /TOPR signal is output (102-2-S). Subsequently, the fusing section 13 carries out the heat fusing of the image completely transferred on the sheet. The sheet passes by the fused paper output sensor 20, and the image formation on first surface of the second sheet is completed (103-2-S).

Next, when receiving the print start command (print ID=1) associated with the print reservation command of the second surface of the first sheet, the engine control section 203 outputs the /TOP signal (100-1-D) to start the print operation of the second surface of the first sheet. Thus, the sheet is transported from the duplexer (101-1-D), and the /TOPR signal is output (102-1-D). Subsequently, the fusing section 13 carries out the heat fusing of the image completely transferred on the sheet. The sheet passes by the fused paper output sensor 20, and the image formation on the second surface of the first sheet is completed (103-1-D). The sheet whose first surface and second surface both undergo the image formation passes by the paper output sensor 28, and is output to the outside of the image forming apparatus.

During the duplex recording of the four sheets as described above, although the engine control section 203 outputs the /TOP signal (100-4-S) of the first surface of the fourth sheet and continues the image formation of the second surface of the first sheet, the fourth sheet has run out. Thus, the fourth sheet cannot be transported from the cassette to the duplexer (101-4-S). When the sheet in the cassette has run out, the engine control section 203 receives a paper-out detection signal from the sensor at the paper feed slot of the paper feed section 1, and places the sheet presence or absence status at a paper-out state (150).

In this case, even after the paper-out is detected, the engine control section 203 outputs the /TOP signal of the second surface of the third sheet (100-3-D) because the single-side printed third sheet is on standby in the duplexer. After outputting the /TOP signal for the second surface of the third sheet, the engine control section 203 notifies the controller section 201 that a misprint has occurred because of the paper-out (151).

Although the engine control section 203 detects the paper-out of the fourth sheet, it outputs the /TOPR signal as to the fourth sheet with which the /TOP signal has already been output at 100-4-S to ensure the controller section 201 of the matching of the timings and the like of the image forming operation (102-4-S).

The engine control section 203 sets the sheet transport status at not-in-transit when the image formation of the first and second surfaces of the third sheet has been completed, and when the sheet has passed by the fused paper output sensor 20 and has been transported to the outside of the image forming apparatus (152).

In the present embodiment, even if it detects that the fourth sheet has run out, the engine control section 203 outputs the /TOP signal for the image of the second surface of the third sheet according to the print ID information, and forms the image of the second surface of the third sheet on the intermediate transfer body 12. Then, to adjust the image formation timing, that is, the timing for transferring the image from the intermediate transfer body 12 to the sheet, the engine control section 203 outputs the /TOPR signal for transferring the image of the first surface of the fourth sheet. Subsequently, the engine control section 203 outputs the /TOPR signal for the image of the second surface of the third sheet to transfer the image of the second surface of the third sheet formed on the intermediate transfer body 12 to the sheet.

Thus, as for the image of the first surface of the fourth sheet, the engine control section 203 outputs the /TOPR signal for the image of the first surface of the fourth sheet in order to transfer the image on the intermediate transfer body to the second surface of the third sheet properly with maintaining the sequence of the alternate image formation of the four sheets in the duplex image forming operation. Subsequently, the engine control section 203 outputs the /TOPR signal of the image of the second surface of the third sheet.

As for the image of the first surface of the fourth sheet, it is formed before the image of the second surface of the third sheet is formed in the normal state without the occurrence of the paper-out. However, since the paper-out has occurred, its formation on the intermediate transfer body 12 is prevented. More specifically, the engine control section 203 carries out the following control. First, although the engine control section 203 receives the image data sent from the controller section 201 in response to the /TOP signal, it prevents the light emission from the scanners (10Y, 10M, 10C, 10K) to hinder the image formation on the photosensitive drums (5Y, 5M, 5C, 5K).

Subsequently, the engine control section 203 carries out the control in such a manner that it halts the image formation after transferring the image onto the second surface of the third sheet refed from the duplexer and outputting it to the outside of the apparatus. Alternatively, as for the image of the first surface of the fourth sheet, it can be formed instead of inhibiting the light emission of the scanners. In this case, however, the transfer roller 9 must be placed at the position 9*b* (separated state) to make through the transfer section (the nip between the intermediate transfer body and the transfer roller), and be cleaned with the cleaning means 21 thereafter.

When the misprint due to the paper-out has occurred in the engine, and the sheet transport status of the engine becomes not-in-transit, the controller section 201 determines the print ID necessary for the recovery. Specifically, the controller section 201 determines the print ID necessary for the recovery by receiving from the engine control section 203 the reservation ID registered already, the ID associated with the paper feed from the paper feed section, and the ID with which the print has already started. In the example of FIG. 8, a decision is made that the retransmission of only the fourth sheet is necessary from the reservation ID, in-paper-feed ID and in-printing ID for the print ID as shown in FIG. 9. The engine control section 203 executes the misprint release sequence in response to the misprint release command from the controller section 201. In the conventional example, since the third sheet having its one side printed remain in the duplexer as a residual sheet, the processing is necessary for outputting the residual third sheet after the misprint release. The third sheet has been paper fed before making the paper-out decision, and has undergone the single side print. In the conventional example, the print ID of the single-side printed sheet is also subjected to the recovery. In the present embodiment, however, the output finishes after the duplex image formation has been completed up to the single-side printed third sheet. Thus, the additional paper output processing becomes unnecessary. In addition, since the number of sheets to be subjected to the recovery reduces, the waste of the sheet is eliminated.

Moreover, in the present embodiment, the engine control section 203 outputs the timing signal (/TOPR signal) for the image of the first surface of the fourth sheet in the paper-out to adjust the transfer timing of the image of the second surface of the third sheet. This makes it possible for the image forming apparatus having the intermediate transfer body as in the present embodiment to form the image properly on the second surface of the sheet remaining in the apparatus with its single-side printed, and to output it.

Embodiment 2

The present embodiment is characterized in that even if a paper-out occurs during the alternate duplex image formation of three sheets, a sheet which has completed its image formation of its single side and is on standby in the image forming apparatus undergoes and completes the image formation of the second surface without fail. In other words, it proposes a method of stopping waste of single-side printed sheets in the duplexer, and of outputting them to the outside of the apparatus after printing properly. The term “three sheet alternate duplex sequence” refers to the control for forming images while carrying out paper feed alternately from the paper feed section 1 and the duplexer in a condition in which two sheets are made to wait in the duplexer. Incidentally, since the configuration and basic operation of the image forming apparatus are the same as those described before, their description is omitted here, and the drawings are assigned the same reference numerals.

Figure 10:
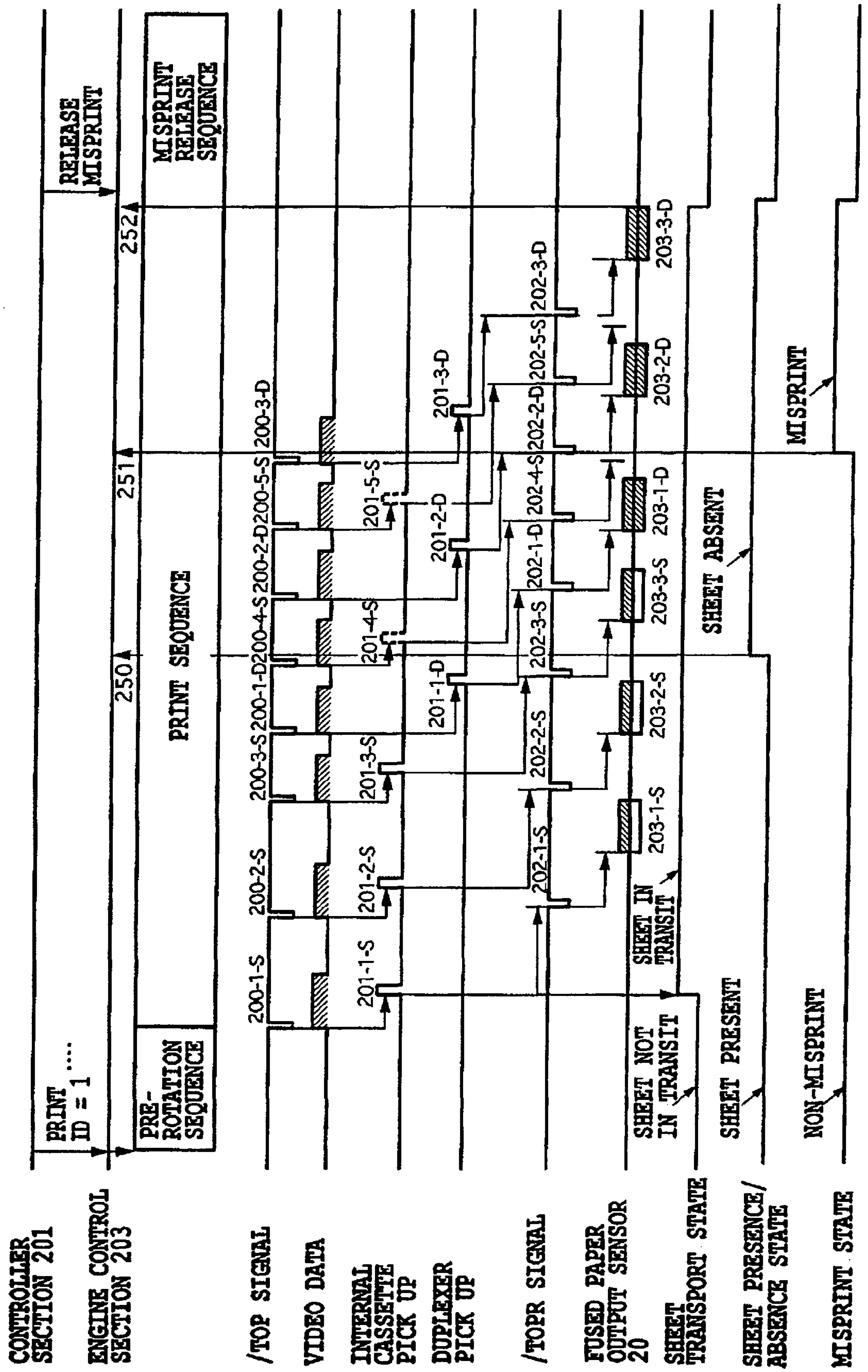
FIG. 10 is a diagram showing a case where a paper-out is detected during the alternate duplex image formation of five sheets in an embodiment 2.

FIG. 10 illustrates an image forming sequence when the printing cannot be continued because the sheet in the paper feed section 1 has run out at the fourth sheet while carrying out the duplex image formation of five sheets according to the three sheet alternate duplex sequence. The engine control section 203 starts the pre-rotation sequence when it receives the print start command (print ID=1) associated with the print reservation command of the first surface of the first sheet. After completing the pre-rotation sequence, the engine control section 203 outputs the /TOP signal (200-1-S) to start the print operation of the first sheet, and to transport a sheet from the cassette to the duplexer (201-1-S). The controller section 201 supplies the video data to the engine control section 203 in synchronization with the /TOP signal, and starts the image formation. The engine control section 203 carries out with the registration sensor 19 the timing adjustment between the sheet fed from the cassette and the image transferred onto the intermediate transfer body by the image forming section. By performing the timing adjustment, the engine control section 203 outputs the /TOPR signal, and refeeds the sheet to transfer the image onto the sheet (202-1-S). The image transferred onto the sheet undergoes heat fusing by the fusing section 13, and passes by the fused paper output sensor 20, thus completing the image formation on the first surface of the first sheet (203-1-S).

Likewise, receiving the print start command (print ID=2) associated with the print reservation command of the first surface of the second sheet, the engine control section 203 outputs the /TOP signal (200-2-S) to start the print operation of the first surface of the second sheet. Thus, the sheet is transported from the cassette to the duplexer (201-2-S), and the /TOPR signal is output (202-2-S). Subsequently, the fusing section 13 carries out the heat fusing of the image completely transferred on the sheet. The sheet passes by the fused paper output sensor 20, and the image formation on first surface of the second sheet is completed (203-2-S).

In the three sheet alternate duplex, further receiving the print start command (print ID=3) associated with the print reservation command of the first surface of the third sheet, the engine control section 203 outputs the /TOP signal (200-3-S), and starts the print operation of the first surface of the third sheet. Specifically, the engine control section 203 transport the sheet from the cassette to the duplexer (201-3-S), and outputs the /TOPR signal (202-3-S). Subsequently, the fusing section 13 carries out the heat fusing of the image that has been completely transferred on the sheet. The sheet passes by the fused paper output sensor 20, and the image formation on the first surface of the third sheet is completed (203-3-S).

Next, when receiving the print start command (print ID=1) associated with the print reservation command of the second surface of the first sheet, the engine control section 203 outputs the /TOP signal (200-1-D) to start the print operation of the second surface of the first sheet. Thus, the sheet is transported from the duplexer (201-1-D), and the /TOPR signal is output (202-1-D). Subsequently, the fusing section 13 carries out the heat fusing of the image completely transferred on the sheet. The sheet passes by the fused paper output sensor 20, and the image formation on the second surface of the first sheet is completed (203-1-D). The first sheet whose first surface and second surface both undergo the image formation passes by the paper output sensor 28, and is output to the outside of the image forming apparatus.

During the duplex recording of the five sheets as described above, although the engine control section 203 outputs the /TOP signal (200-4-S) of the first surface of the fourth sheet and starts the image formation of the second surface of the first sheet, the fourth sheet has run out. Thus, the fourth sheet cannot be transported from the cassette (201-4-S). When the sheet in the cassette has run out, the engine control section 203 receives a paper-out detection signal from the sensor of the paper feed section 1, and places the sheet presence or absence status at the paper-out state (250). In this case, even after the paper-out is detected, the engine control section 203 outputs the /TOP signals of the second surfaces of the second and third sheets (200-2-D and 200-3-D) because the single-side printed second and third sheets are on standby in the duplexer.

After outputting the /TOP signal for the second surface of the third sheet, the engine control section 203 notifies the controller section 201 that a misprint has occurred because of the paper-out (251). In addition, although the fourth sheet has run out, the engine control section 203 outputs the /TOP signals (200-4-S, 200-5-S) Then, as for the fourth and fifth sheets with which the /TOP signals have been output, the engine control section 203 outputs the /TOPR signals to ensure the controller section 201 of the matching of the timings and the like of the image forming operation (202-4-S, 202-5-S).

After the notification of the misprint, the engine control section 203 outputs the /TOPR signals in the order of, the /TOPR signal for the image of the second surface of the second sheet, the /TOPR signal for the image of the first surface of the fifth sheet, and the /TOPR signal of the image of the second surface of the third sheet. Then, the engine control section 203 sets the sheet transport status at not-in-transit when the image formation of the first and second surfaces of the second and third sheets has been completed, and when the sheets have passed by the fused paper output sensor 20 and have been transported to the outside of the image forming apparatus (252).

In the present embodiment, even if it detects that the fourth sheet has run out, the engine control section 203 outputs the /TOP signal for the image of the second surface of the second sheet and the /TOP signal for the image of the second surface of the third sheet according to the print ID information, and forms the images of the second surfaces of the second and third sheets on the intermediate transfer body 12.

Then, to adjust the image formation timing, that is, the timing for transferring the image from the intermediate transfer body 12 to the sheet by maintaining the image forming operation of the duplex alternation of the five sheets, the engine control section 203 outputs the next signal. Specifically, it outputs the /TOPR signal for transferring the image of the first surface of the fourth sheet and the /TOPR signal for transferring the image of the first surface of the fifth sheet.

As described above, the engine control section 203 outputs the /TOPR signals in the order of the /TOPR signal for the image of the first surface of the fourth sheet, the /TOPR signal for the image of the second surface of the second sheet, the /TOPR signal for the image of the first surface of the fifth sheet, and the /TOPR signal of the image of the second surface of the third sheet. Thus, the images can be transferred to the second surfaces of the second and third sheets.

By adjusting the image formation timing onto the intermediate transfer body by thus outputting the /TOPR signals, it becomes possible to transfer the images formed on the intermediate transfer body properly at the timing at which the single-side printed sheets are refed and reach the transfer position.

As for the images of the first surfaces of the fourth and fifth sheets, they are formed before the image of the second surface of the second sheet and before the image of the second surface of the third sheet in the normal state, respectively. However, since the paper-out has occurred as to the fourth sheet and on, their formation on the intermediate transfer body 12 is prevented. More specifically, although the engine control section 203 receives the image data sent from the controller section 201 in response to the /TOP signal, it prevents the light emission from the scanners (10Y, 10M, 10C, 10K) to hinder the image formation on the photosensitive drums (5Y, 5M, 5C, 5K).

Subsequently, the engine control section 203 carries out the control in such a manner that it halts the image formation after transferring the images onto the second surfaces of the second and third sheets refed from the duplexer and outputting them to the outside of the apparatus.

Incidentally, as for the images of the first surfaces of the fourth and fifth sheets, they can be formed on the intermediate transfer body instead of inhibiting the formation. In this case, the transfer roller 9 must be placed at the position 9*b* (separated state) to make through the transfer section (the nip between the intermediate transfer body and the transfer roller) to prevent the transfer onto the recording sheets, and be cleaned with the cleaning means 21 thereafter.

When the misprint due to the paper-out has occurred in the engine, and the sheet transport status of the engine becomes not-in-transit, the controller section 201 determines the print ID necessary for the recovery. Specifically, the controller section 201 determines the print ID necessary for the recovery by receiving from the engine control section 203 the reservation ID registered already, the ID associated with the paper feed from the paper feed section, and the ID with which the print has already started. In the example of FIG. 10, a decision is made that the retransmission of only the fourth and fifth sheets is necessary from the reservation ID, in-paper-feed ID and in-printing ID for the print ID as shown in FIG. 11. The engine control section 203 executes the misprint release sequence in response to the misprint release command from the controller section 201. As in the conventional example, the second and third sheets having their one side printed remain in the duplexer. Accordingly, the processing is necessary for outputting, after the misprint release, the residual second and third sheets having their one side printed. The second and third sheets having their one side printed are the sheets that have been fed before making the paper-out decision, and their single sides have already been printed. In the conventional example, the print IDs of the single-side printed sheets are also subjected to the recovery. As for the single-side printed sheets in the present embodiment, however, they are not output until they have passed through the duplex image formation. Thus, since no sheets remain which have only their single sides subjected to the image formation, the additional paper output processing becomes unnecessary. In addition, since the number of sheets to be subjected to the recovery reduces, the waste of the sheet is eliminated.

Moreover, in the present embodiment, the engine control section 203 outputs the timing signals (/TOPR signals) for the images of the first surfaces of the fourth and fifth sheets in the paper-out to adjust the transfer timing of the images of the second surfaces of the second and third sheets. This makes it possible for the image forming apparatus having the intermediate transfer body as in the present embodiment to form the images properly on the second surfaces of the sheets remaining in the apparatus with their single-sides printed, and to output them.

Embodiment 3

The embodiment 1 proposes a method of outputting a normally printed sheet to the outside of the apparatus without wasting the sheet in the duplexer when a paper-out occurs during the two-sheet alternate duplex sequence. Likewise, the embodiment 2 proposes a method of outputting a normally printed sheet to the outside of the apparatus without wasting the sheets in the duplexer when a paper-out occurs during the three-sheet alternate duplex sequence. The present embodiment proposes a method of completing the image formation of the second surfaces of the sheets which have completed their single side image formation and are on standby in the image forming apparatus, even when a paper-out occurs during N-sheet alternate duplex sequence. In other words, it proposes a method of outputting the normally printed sheets to the outside of the apparatus without wasting the sheet in the duplexer when a paper-out occurs during the N-sheet alternate duplex. The term “N-sheet alternate duplex sequence” refers to the control for forming images while carrying out paper feed alternately from the paper feed section 1 and the duplexer in a condition in which N-1 sheets are made to wait in the duplexer. Incidentally, since the configuration and basic operation of the image forming apparatus are the same as those described before, their description is omitted here, and the drawings are assigned the same reference numerals.

Figure 12:
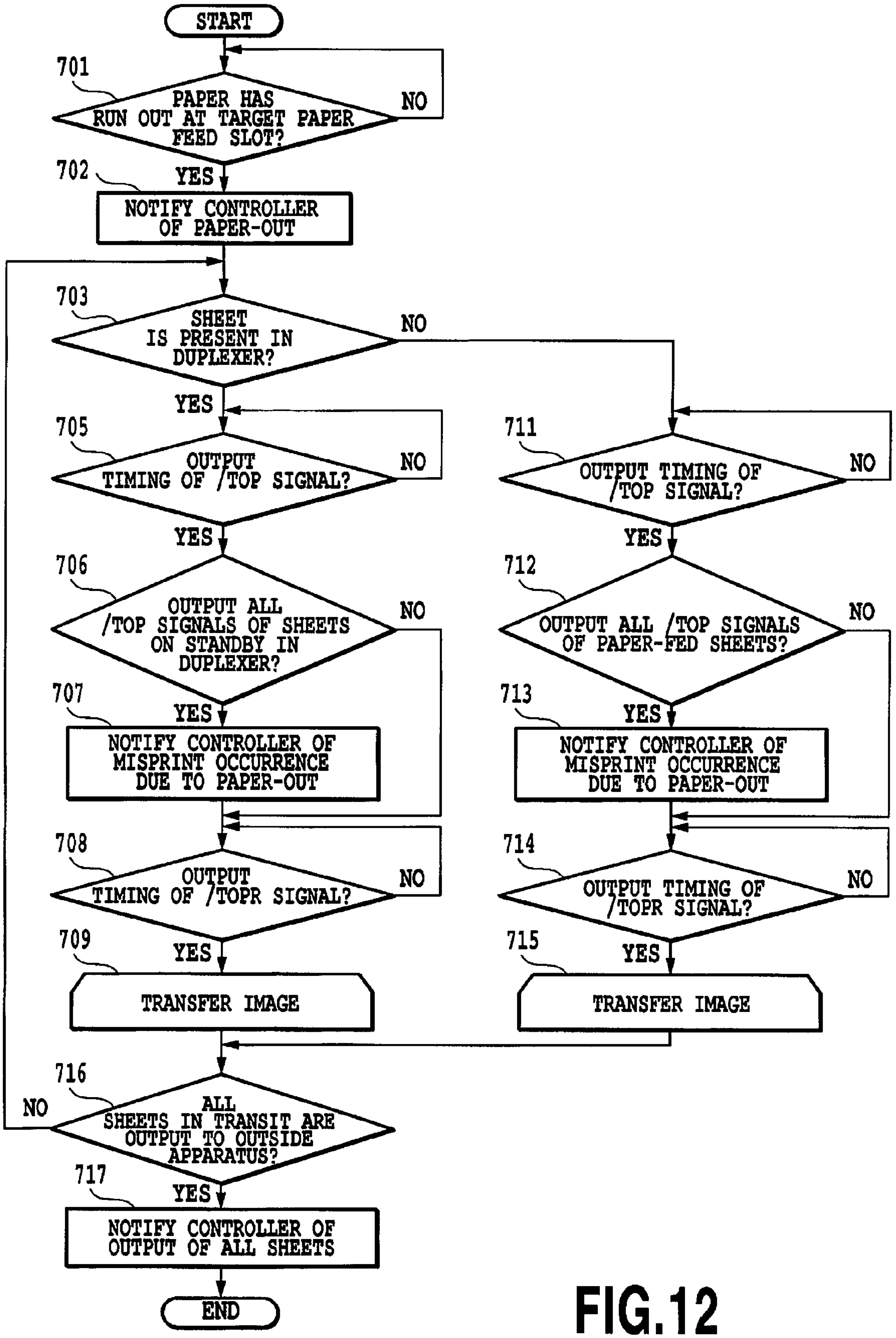
FIG. 12 is a flowchart illustrating a processing in a case of misprint due to a paper-out during duplex alternate image formation of N sheets in an embodiment 3.

FIG. 12 shows a control flow from the time when the sensor at the paper feed slot of the paper feed section, which carries out the paper feed, detects a paper-out, up to the time when the engine control section 203 notifies the controller section 201 of the sheets to be subjected to the misprint. The correspondence between the sequential steps of FIG. 8 of the embodiment 1 and the steps of the control flow are as follows: The step 150 in FIG. 8 corresponds to 701; 151 to 707 and 713; and 152 to 717. In the embodiment 2, the step 250 of FIG. 10 corresponds to 701; 251 to 707 and 713; and 252 to 717.

First, when the sensor in the paper feed section detects a paper-out of a sheet to be paper fed (701), the engine control section 203 notifies the controller section 201 of the paper-out (702). At the paper-out, the engine control section 203 counts the number of sheets that are on standby in the duplexer (703), and repeats the processing from 705 to 709 as long as any sheets that are on standby remain in the duplexer. If no sheet is on standby in the duplexer, the engine control section 203 repeats the processing from 711 to 715.

The processing from 711 to 715 will be described. At 711, as for the sheets that have already been paper fed by the time when the paper-out is detected, the engine control section 203 outputs the /TOP signal. Subsequently, when the /TOP signals of all the paper fed sheets have been output (712), the engine control section 203 notifies the controller section 201 that a misprint occurs due to the paper-out (713), and advances the processing to 714. In contrast, unless the /TOP signals of all the paper-fed sheets are output at 712, the engine control section 203 advances the processing to 714. The engine control section 203 outputs the /TOPR signal at 714, and transfers the image onto the corresponding sheet at 715, followed by heat fusing. Then as for the sheet whose image formation has been completed on both the first and second surfaces, the engine control section 203 outputs it to the outside of the apparatus, and proceeds to 716.

Next, the processing from 705 to 709 will be described. The processing from 705 to 709 is repeated until all the sheets that are on standby in the duplexer have been output to the outside of the image forming apparatus. At 705, the engine control section 203 outputs the /TOP signal at the /TOP signal output timing, notifies the controller section 201 that a misprint due to the paper-out occurs (707) at the time when the /TOP signals of all the sheets that are on standby in the duplexer are output (706), and proceeds to 708. Unless the /TOP signals of all the sheets that are on standby in the duplexer are output at 706, the engine control section 203 proceeds to 708. The engine control section 203 outputs the /TOPR signal of the corresponding sheet at the /TOPR signal output timing at 708, and transfers the image onto the corresponding sheet at 709, followed by heat fusing. Then as for the sheet whose image formation has been completed on both the first and second surfaces, the engine control section 203 outputs it to the outside of the apparatus, and proceeds to 716.

After completing the processing from 705 to 709, and the processing from 711 to 715, the engine control section 203 confirms that all the sheets in transit have been output to the outside of the image forming apparatus (716). At 716, unless all the sheets have been output to the outside of the apparatus, the engine control section 203 returns to 703. In contrast, when all the sheets have been output, the engine control section 203 notifies the controller section 201 that no sheet is in transportation at 717, and completes the processing.

The foregoing processing makes it possible to complete the image formation of the second surfaces of the sheets that are on standby in the image forming apparatus after completing the single side image formation, even if the paper-out occurs during the N-sheet alternate duplex sequence. In other words, it can output the normally printed sheets to the outside of the apparatus without wasting the single-side printed sheets remaining in the duplexer at the occurrence of the paper-out.

As the embodiments 1 and 2, the present embodiment outputs the /TOP signals and /TOPR signals for the images on the first surfaces of the sheets that are not paper fed because of the paper-out to adjust the timing of forming the image on the intermediate transfer body. Thus, the present embodiment, which is an image forming apparatus having the intermediate transfer body, can properly form images on the second surfaces of the sheets that remain in the apparatus with their single-side printed.

In this regard, with respect to the above embodiments 1, 2, and 3, the case that a paper-out occurs during the alternate duplex sequence has been described. However, the present invention can carry out the same alternate duplex sequence not only when a paper-out occurs, but also when an error occurs such as a delay in transporting the sheets fed from the paper feed section 1, and a paper feed failure. The delay in transporting the fed sheets and the paper feed failure can be detected by checking whether the sheet reaches the sensor A 23 or the sensor A 24 when a predetermined period has elapsed from the feed start timing.

The present invention is not limited to the foregoing embodiments, but can include variations based on the same technical idea.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application Nos. 2004-363592 filed Dec. 15, 2004 and 2005-328026 filed Nov. 11, 2005, which are hereby incorporated by reference herein.

What is claimed is:

1. An image forming apparatus comprising:

an image forming section for forming an image on a transfer body;

a transfer section for transferring the image formed on said transfer body to a recording medium;

a recording medium holding section for holding the recording medium;

a feeding section for feeding the recording medium from said recording medium holding section to said transfer section;

a recording medium detecting section for detecting the recording medium in the said recording medium holding section; and a control section for controlling a transport operation of the recording medium, wherein when said recording medium detecting section detects that there are no recording medium in said recording medium holding section during an image forming operation of both sides of a plurality of recording mediums, said control section carries out a control operation for the image formation on a recording medium not fed by said feeding section so as to form an image to a second surface of the recording medium that is being transported in said apparatus and has an image formed on its first surface.

2. The image forming apparatus as claimed in claim 1, wherein said control operation is an operation of forming an image associated with the not-fed recording medium on said transfer body by said image forming section.

3. The image forming apparatus as claimed in claim 2, further comprising a cleaner for cleaning said transfer body, wherein said cleaner cleans, after transferring the image to a second surface of the recording medium which is being transported in said apparatus and formed the image to its first surface, an image which is formed on said transfer body and is associated with the not-fed recording medium.

4. The image forming apparatus as claimed in claim 1, wherein said control operation is an operation that rotates said transfer body without forming the image associated with the not-fed recording medium on said transfer body.

5. The image forming apparatus as claimed in claim 1, wherein said control section outputs a timing signal for forming on said transfer body an image of a first surface of the not-fed recording medium by said feeding section, after outputting a timing signal for forming on said transfer body an image of a second surface of the recording medium which is being transported in said apparatus and formed the image to its first surface.

6. The image forming apparatus as claimed in claim 1, further comprising a controller capable of communicating with said control section, wherein said control section controls the image forming operation of both sides of the plurality of recording mediums according to print reservation information transmitted from said controller.

7. A control method of an image forming apparatus comprising:

a step of detecting a recording medium in a recording medium holding section during an image forming operation of both sides of a plurality of recording mediums;

a step, when detecting that there are none of the recording mediums in the recording medium holding section during an image forming operation of both sides of a plurality of recording mediums, of carrying out a control operation for the image formation when recording medium are not fed from the recording medium holding section; and a step of forming an image on a second surface of the recording medium which is being transported in said apparatus and formed an image to its first surface after carrying out the control operation.

8. The control method as claimed in claim 7, wherein said image forming apparatus comprises an image forming section for forming an image on a transfer body, and wherein said step of carrying out the control operation includes a step of forming an image associated with the not-fed recording medium on said transfer body by said image forming section.

9. The control method as claimed in claim 8, wherein said image forming apparatus comprises a cleaner for cleaning said transfer body, and further comprising a step of cleaning, after transferring the image to a second surface of the recording medium which is being transported in said apparatus and formed the image to its first surface, an image which is formed on said transfer body and is associated with the not-fed recording medium.

10. The control method as claimed in claim 7, wherein said image forming apparatus comprises an image forming section for forming an image on a transfer body, and wherein said step of carrying out the control operation includes a step of rotating said transfer body without forming the image associated with the not-fed recording medium on said transfer body by said image forming section.

11. The control method as claimed in claim 7, wherein said image forming apparatus comprises an image forming section for forming an image on a transfer body, and wherein said step of carrying out the control operation includes a step of outputting a timing signal for forming on said transfer body an image of a first surface of the not-fed recording medium before outputting a timing signal for forming on said transfer body an image of a second surface of the recording medium which is being transported in said apparatus and formed the image to its first surface.

12. An image forming apparatus comprising:

an image forming section for forming an image on a transfer body;

a transfer section for transferring the image formed on said transfer body to a recording medium;

a feeding section for feeding the recording medium to said transfer section;

a detecting section for detecting a feed condition of the recording medium fed by said feeding section; and a control section for controlling an operation of said image forming section, wherein when said detecting section detects that a recording medium is not fed to said transfer section during an image forming operation of both sides of a plurality of the recording mediums, said control section carries out control operation for the image formation of the not-fed recording medium by said feeding section so as to form the image to a second surface of the recording medium that is being transported in said apparatus and formed an image to its first surface.

13. An image forming apparatus according to claim 12, wherein said control operation is an operation that output a timing signal for forming on said transfer body an image of a first surface of the not-fed recording medium by said feeding section before outputting a timing signal for forming on said transfer body an image of a second surface of the recording medium which is being transported in said apparatus and formed the image to its first surface.

* * * * *